(12) United States Patent
Hall

(10) Patent No.: US 9,326,483 B2
(45) Date of Patent: May 3, 2016

(54) PET SHELTER

(71) Applicant: Jeanne L. Hall, Flagstaff, AZ (US)

(72) Inventor: Jeanne L. Hall, Flagstaff, AZ (US)

(*) Notice: Subject to any disclaimer, the term of this patent is extended or adjusted under 35 U.S.C. 154(b) by 187 days.

(21) Appl. No.: 14/316,423

(22) Filed: Jun. 26, 2014

(65) Prior Publication Data

US 2015/0373944 A1 Dec. 31, 2015

(51) Int. Cl.
*A01K 1/03* (2006.01)

(52) U.S. Cl.
CPC ...................... *A01K 1/033* (2013.01)

(58) Field of Classification Search
CPC ..... A01K 1/02; A01K 1/0236; A01K 1/0245; A01K 1/03; A01K 1/032; A01K 1/033; A01K 1/034; A01K 15/02; A01K 15/024
USPC ................ 119/482, 498, 706; 220/4.26, 4.27, 220/23.6, 380, 781
See application file for complete search history.

(56) References Cited

U.S. PATENT DOCUMENTS

| | | | |
|---|---|---|---|
| 595,455 A | 12/1897 | Glidden | |
| 4,301,766 A * | 11/1981 | Piccone | A01K 1/035 119/482 |
| 4,347,807 A | 9/1982 | Reich | |
| D279,393 S | 6/1985 | Hilko | |
| 5,979,366 A | 11/1999 | Cook | |
| 6,431,119 B1 | 8/2002 | Beymer | |
| D476,780 S * | 7/2003 | Cheshire | D30/108 |
| 6,758,167 B1 * | 7/2004 | Edelinski | A01K 1/033 119/498 |
| D494,780 S | 8/2004 | Harwanko | |
| D524,994 S | 7/2006 | Hamm | |
| D563,604 S | 3/2008 | Pacana et al. | |
| 7,337,748 B1 * | 3/2008 | Morris | A01K 1/033 119/482 |
| 7,578,264 B2 | 8/2009 | Guard | |
| D604,016 S | 11/2009 | Langston | |
| D611,204 S | 3/2010 | Slater | |
| 2008/0196675 A1 * | 8/2008 | Murrer | A01K 1/033 117/706 |
| 2012/0186534 A1 * | 7/2012 | Lu | A01K 1/035 119/706 |
| 2013/0036986 A1 | 2/2013 | Callari | |

* cited by examiner

*Primary Examiner* — Joshua Rodden
(74) *Attorney, Agent, or Firm* — Cahill Glazer PLC

(57) ABSTRACT

A stackable, nestable pet shelter includes first, second and third housings. Each housing has a top of a predetermined shape and sidewalls that extend downwardly, and taper somewhat outwardly, toward an open bottom. In use, the bottom of the second housing rests upon the upper portion of the first housing, and the bottom of the third housing rests upon the upper portion of the second housing. The first and second housings are substantially hollow. When not in use, the third housing nests within the second housing which, in turn, nests within the first housing. An opening is provided in the sidewalls of the first housing for allowing an animal to enter or exit. The top of each housing includes an opening for allowing an animal to pass from one housing to the next.

14 Claims, 4 Drawing Sheets

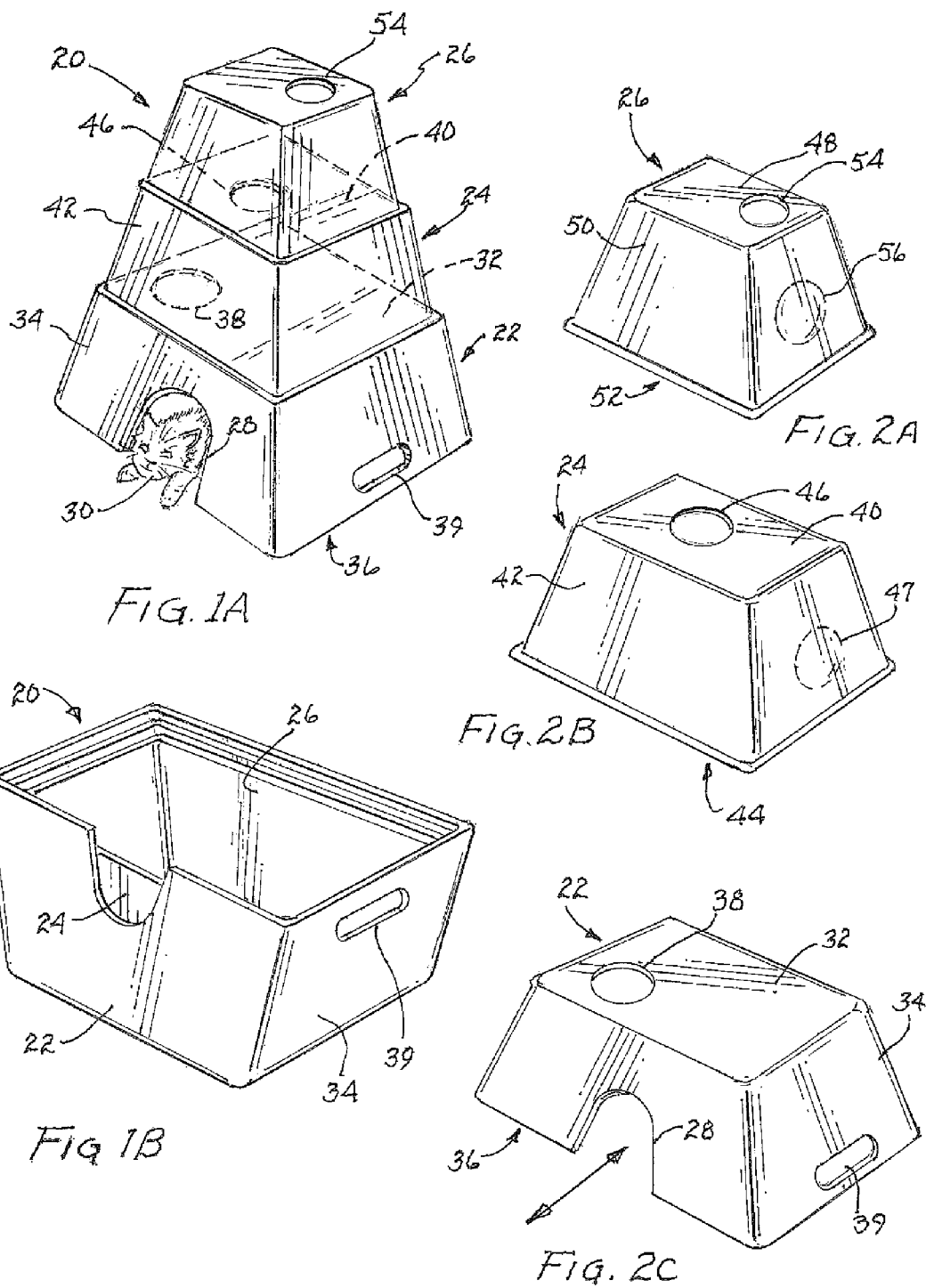

PET SHELTER

BACKGROUND OF THE INVENTION

1. Field of the Invention

The present invention relates generally to apparatus for sheltering and entertaining house pets, and more particularly, to a pet shelter formed of stackable elements that may be nested together into a compact assembly when not in use.

2. Description of the Relevant Art

Cats, and many other house pets, often desire to rest within confined places. Perhaps such confined places provide a sense of security to such animals. On the other hand, cats, as well as other house pets, often enjoy climbing and exploring as a form of exercise and entertainment. Cats in particular seem to enjoy passing through confined openings, while pressing their bodies against the edges of such openings, simulating the scratching of their fur.

Structures that provide enclosed spaces for pets, and which also allow a pet to climb from ground level to one or more upper levels are known. For example, U.S. Pat. No. 4,347,807 to Reich discloses a "cat condominium" which, when assembled, forms a multiple-level shelter for cats. When not in use, the "cat condominium" can be disassembled into a flattened shape.

U.S. Pat. No. 5,979,366 to Cook discloses a cat entertainment box housing an enclosed space with openings formed therein for allowing a cat to hide inside while allowing a cat to enter into, or exit from, the box, either through a side opening or a top opening. While a cat may climb onto the top of the box, there is no "second floor" for the cat to hide within.

U.S. Pat. No. 6,431,119 to Beymer discloses a cat structure including a hollow base along with components for forming a sleeping/play area supported above the hollow base. The components used to form the sleeping/play area may be disassembled and stored within the hollow base unit when not in use.

U.S. Pat. No. 7,578,264 to Guard discloses a stackable pet shelter, wherein a first such pet shelter may be used to form a base, and a second such pet shelter may be stacked upon the top of the first pet shelter. Similarly, U.S. Patent Application Publication No. 2013/0036986 to Callari discloses a modular pet house wherein modules may be stacked one upon the other.

Designs for other pet structures, wherein two or more components are stacked upon one another, are shown in U.S. Design Pat. No. D563,604 to Pacana, et al.; in U.S. Design Pat. No. D524,994 to Hamm; U.S. Design Pat. No. D604,016 to Langston; and U.S. Design Pat. No. D611,204 to Slater.

While some of the pet shelters mentioned above can be disassembled without much effort, the components each take up a significant amount of room. When storing such components, a significant amount of storage space is required. In addition, when transporting such components, the pet owner must carry two or more components from place to place, often requiring more than one trip.

Others of the pet shelters mentioned above take longer to disassemble and re-assemble, but collapse into a more compact structure to facilitate transport or storage.

However, none of the pet shelters described above provides a pet shelter that provides multiple levels of enclosures, is easy to assemble and disassemble, and which is also easy to transport and store.

Accordingly, it is an object of the present invention to provide a pet shelter formed of stackable components that can be easily assembled to form a stable structure having two or more levels for being occupied by a pet.

It is another object of the present invention to provide such a pet shelter which may be easily disassembled into a compact assembly no larger than its largest component.

Still another object of the present invention is to provide such a pet shelter which, when disassembled, may be easily transported by a pet owner.

Yet another object of the present invention is to provide such a pet shelter which may be stored as a relatively compact structure when not in use.

A further object of the present invention is to provide such a pet shelter having component parts that may be manufactured easily and inexpensively.

A still further object of the present invention is to provide such a pet shelter wherein a pet owner can easily create additional openings within the included components, if desired.

A yet further object of the present invention is to provide such a pet shelter which may be configured by a pet owner to be of varying height and varying number of levels.

These and other objects of the invention will become more apparent to those skilled in the art as the description of the present invention proceeds.

SUMMARY OF THE INVENTION

Briefly described, and in accordance with a preferred embodiment thereof, the present invention relates to a stackable, nestable pet shelter that includes at least first, second and third housings. The first housing is generally hollow and includes a first top of a predetermined shape, as well as first sidewalls extending downwardly the first top toward an opposing open bottom. The first sidewalls taper outwardly from the first top toward the opposing open bottom. An opening is provided within the first sidewalls for allowing an animal to enter into and exit therefrom. An opening is also formed in the first top for allowing an animal to pass therethrough.

The second housing likewise generally hollow and includes a second top of the same general shape as the first top but smaller in size. The second housing likewise includes second sidewalls that extend downwardly from the second top toward an opposing open bottom, while tapering outwardly from the second top toward the opposing open bottom. The open bottom of the second housing is of similar size and shape as the first top for allowing the open bottom of the second housing to stack upon the first housing. The height of the second housing does not exceed that of the first housing. An opening is provided in the second top for allowing an animal to pass therethrough.

The third housing includes a third top of the same general shape as the second top but of smaller size. The third housing also includes third sidewalls extending downwardly from the third top toward an opposing open bottom, while again tapering outwardly from the third top toward the opposing open bottom. The open bottom of the third housing has a size and shape similar to that of the second top for allowing the open bottom of the third housing to stack upon the second housing. The height of the third housing does not exceed the height of the second housing. An opening may also be formed within the third housing, either within the third top for allowing an animal to pass therethrough, or within the third sidewalls to serve as a window.

When in use, the second housing can be stacked upon the first housing, and the third housing can be stacked upon the second housing, to form a multiple level pet shelter. When not in use, the second housing can be nested within the first housing, and the third housing can be nested within the second housing to form a compact structure for storage or transport.

Preferably, handhold cutouts formed within the first sidewalls proximate the open bottom of the first housing to facilitate carrying the nested components when the pet shelter is to be transported.

In accordance with one embodiment, the first top includes a first raised lip extending along its outer perimeter. The open bottom of the second housing fits within the first raised lip of the first top when the second housing is stacked thereupon. Preferably, the second top likewise includes a second raised lip extending along its outer perimeter, and the open bottom of the third housing fits within the second raised lip when the third housing is stacked upon the top of the second housing.

In accordance with a second embodiment, the open bottom of the second housing includes a lip that extends over, and engages, the upper portion of the first housing when the second housing is stacked thereupon. Similarly, the open bottom of the third housing includes a lip that extends over, and engages, the upper portion of the second housing when the third housing is stacked thereupon.

Optionally, the sidewalls of the second and/or third housings includes a reduced thickness relief area. If desired, a pet owner may remove the material bounded by such relief area, as by punching it out, to form an additional opening in such sidewalls.

Preferably, openings formed in the tops of succeeding housings are offset from one another. For example, the opening in the second top is laterally offset from the openings in the first and third tops to prevent an animal from falling directly from the third housing into the first housing.

In order to simplify manufacture and reduce expense, the first, second, and third housings are preferably formed of plastic material, and are formed by molding.

The pet shelter of the present invention can assume one of a variety of shapes. For example, the first, second and third tops may each have a shape that is generally rectangular, generally oval, generally triangular, generally square, or generally circular.

In an alternate embodiment, the housings may be formed of separable top and sidewall portions. For example, the top of the first housing may be formed separately from the sidewalls of the first housing. In this case, the top of the first housing may be attachable to, and detachable from, the upper end of the first sidewalls. Likewise, the top of the second housing may be attachable to, and detachable from, the upper end of the second sidewalls.

BRIEF DESCRIPTION OF THE DRAWINGS

FIG. 1A is a perspective view of a stackable and collapsible pet shelter having three nesting components in accordance with a preferred embodiment of the present invention.

FIG. 1B is a perspective view of the components shown in FIG. 1A after being collapsed and nested inside one another to form a compact assembly for transport or storage.

FIG. 2A is a perspective view of the uppermost unit of the pet shelter shown in FIG. 1A, including an optional circular relief area formed in the sidewall.

FIG. 2B is a perspective view of the middle unit of the pet shelter shown in FIG. 1A, also including an optional circular relief formed in the sidewall.

FIG. 2C is a perspective view of the lowermost unit of the pet shelter shown in FIG. 1A.

DETAILED DESCRIPTION OF THE PREFERRED EMBODIMENT

Figure 3:
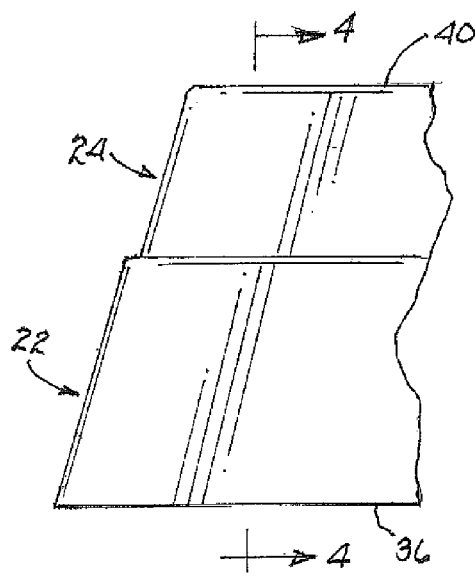
FIG. 3 is a partial side view of the middle unit resting upon the lowermost unit in accordance with a first embodiment of the present invention.

One preferred form of a stackable, nestable pet shelter, constructed in accordance with the teachings of the present invention, is designated generally in FIG. 1 by reference numeral 20. Pet shelter 20 includes a first, or lowermost, housing 22, a second, or middle, housing 24, and a third, or uppermost, housing 26. While only three housings are shown, those skilled in the art will appreciate that additional stackable, nestable housings may be provided, if desired, to increase the height of the structure. First housing 22, which is also shown in FIG. 2C separate from housings 24 and 26, is generally hollow. As shown in FIGS. 1A and 2C, first housing 22 includes a side opening 28 for allowing a cat 30, or other pet, to enter into, or exit from, first housing 22. First housing 22 includes a top 32 of generally rectangular shape, as well as sidewalls 34. As shown best in FIG. 2C, sidewalls 34 extend downwardly from top 32 toward an opposing open bottom 36. Sidewalls 34 taper outwardly from top 32 toward open bottom 36. Opening 38 is formed in top 32 for allowing cat 30 to pass upwardly or downwardly therethrough. Preferably, handhold cutouts 39 (see FIGS. 1A, 1B, and 2C) are formed at opposing ends of first housing 22 within sidewalls 34 proximate open bottom 36 to facilitate carrying the nested components when the pet shelter is to be transported.

Referring now to FIGS. 1A and 2B, second housing 24 is generally hollow and includes top 40 of the same general rectangular shape as top 32 but being somewhat smaller in size. Second housing 24 likewise includes sidewalls 42 that extend downwardly from top 40 toward opposing open bottom 44. Sidewalls 42 taper outwardly from top 40 toward open bottom 44. Open bottom 44 of second housing 24 is of similar size and shape as that of first top 32 for allowing open bottom 44 of second housing 24 to stack upon first housing 22. Preferably, the height of second housing 24 does not exceed the height of first housing 22; accordingly, as shown in FIG. 1B, second housing 24 is able to nest completely within first housing 22 when the pet shelter is not in use. Opening 46 is provided in second top 40 for allowing cat 30 to pass upwardly out of second housing 24, or downwardly into second housing 24. In addition, sidewalls 42 of second housing 24 may optionally include one or more reduced thickness relief areas like that designated by 47 in FIG. 2B; if desired, a pet owner may easily remove the material bounded by relief area 47, as by punching it out, or cutting it out, to form an additional opening in sidewalls 42 of second housing 24.

As shown in FIGS. 1A and 2A, third housing 26 includes third top 48 of the same general rectangular shape as second top 40 but being of smaller size. Third housing 26 also includes sidewalls 50 extending downwardly from top 48 toward opposing open bottom 52. Sidewalls 50 taper outwardly from third top 48 toward open bottom 52. Open bottom 52 has a size and shape similar to that of second top 40 for allowing open bottom 52 of third housing 26 to stack upon second housing 24. Once again, it is preferred that the height of third housing 26 does not exceed the height of second housing 24; accordingly, as shown in FIG. 1B, third housing 26 nests completely within second housing 24 when the pet shelter is not in use. Opening 54 is preferably formed within third top 48 of third housing 26 for allowing cat 30 to pass therethrough. If desired, a window may be created in sidewalls 50 of third housing 26, as by punching out, or cutting out, relief area 56. Such window may be in lieu of, or in addition to, opening 54 in third top 48.

Preferably, first housing 22, second housing 24, and third housing 26 are all formed of durable molded plastic material. Plastic molding simplifies manufacture, reduces the expense of the components, and allows the components to be relatively light in weight for easy transport. Plastic molding also allows for production of the pet shelter in a wide variety of colors.

When in use, and as shown in FIG. 1A, second housing 24 is stacked upon first housing 22, and third housing 26 is stacked upon second housing 24, to form a three-level pet shelter. If desired, the general concept can be extended to have four or more floors, by adding additional, stackable housings, allowing a pet owner to configure the pet shelter to be of varying height and varying number of levels.

When not in use, and as shown in FIG. 1B, second housing 24 is nested within first housing 22, and third housing 26 is nested within second housing 24, to form a compact structure for storage or transport. As mentioned above, handhold cutouts 39, formed on either end of first housing 22, make it easy to carry all of the components of pet shelter 20.

Figure 4:
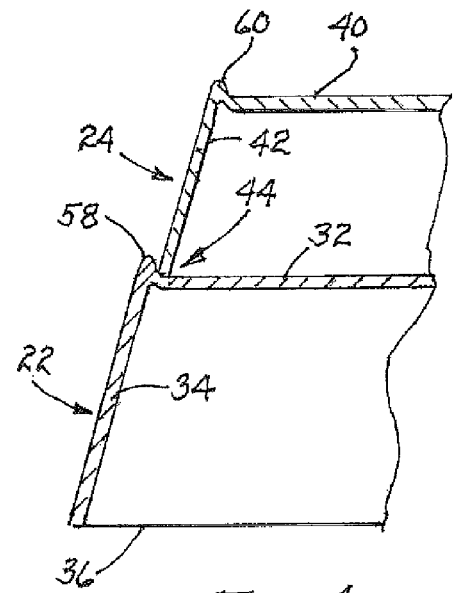
FIG. 4 is a sectional view of a portion of the components shown in FIG. 3, and illustrating how the middle unit interlocks with the lowermost unit below it.

Referring now to FIGS. 3 and 4, a portion of second housing 24 is shown stacked upon first housing 22 in accordance with a first embodiment, wherein top 32 of first housing 22 includes a first raised lip 58 which extends along the outer perimeter to top 32. Open bottom 44 second housing 24 fits within raised lip 58 of first top 32 when second housing 24 is stacked thereupon. Raised lip 58 prevents second housing 24 from sliding off of first housing 22 as a pet climbs within pet shelter 20. Likewise, second top 40 includes a second raised lip 60 extending along its outer perimeter, and open bottom 52 of third housing 26 (not shown in FIGS. 3 and 4) fits within second raised lip 60 when third housing 26 is stacked upon top 40 of second housing 24.

Figure 5:
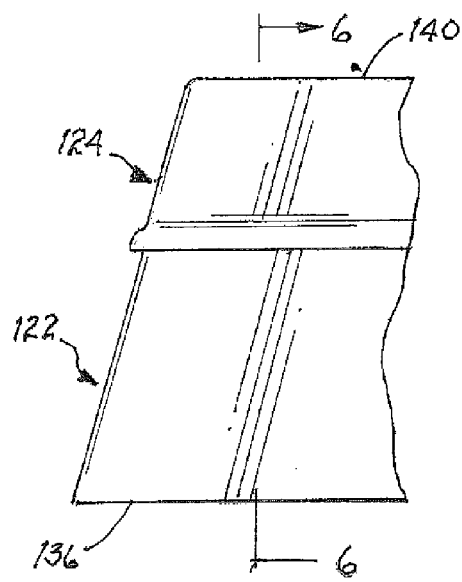
FIG. 5 is a partial side view of the middle unit resting upon the lowermost unit in accordance with a second embodiment of the present invention.
Figure 6:
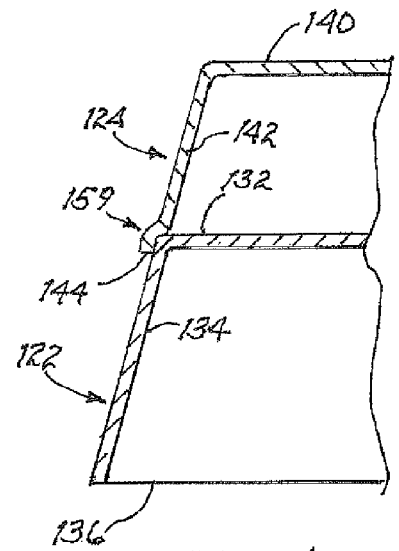
FIG. 6 is a sectional view of a portion of the components shown in FIG. 5, and illustrating how the middle unit interlocks with the lowermost unit below it.

In accordance with a second embodiment of the present invention shown in FIGS. 5 and 6, open bottom 144 of second housing 124 includes an enlarged lip or rim 159 that extends over, and engages, the upper portion of first housing 122 when second housing 124 is stacked thereupon. Rim 159 partially engages top 132 of first housing 122 and partially engages sidewalls 134 of first housing 122. In this manner, open bottom 144 of second housing 124 interlocks with the upper portion of first housing 122, and prevents second housing 124 from sliding off of first housing 122 as a pet climbs within pet shelter 20. Similarly, the open bottom of the third housing (not shown in FIGS. 5 and 6) includes a similar lip or rim that extends over, and engages, the upper portion of second housing 124 when the third housing is stacked thereupon.

Referring again to FIGS. 1A, 2A, 2B, and 2C, opening 38 formed in top 32 of first housing 22 is laterally offset from opening 46 formed in top 40 of second housing 24. Thus, a pet passing downwardly through opening 46 of top 40 will not fall continuously through opening 38 of top 32. Likewise, opening 54 formed in top 48 of third housing 26 is laterally offset from opening 46 formed in top 40 of second housing 124. Accordingly, a pet passing downwardly through opening 54 of top 48 will not fall continuously through opening 46 of top 40. By staggering the location of opening 46 in top 40 from the locations of the openings formed in tops 32 and 48, a pet is prevented from accidentally falling entirely through pet shelter 20.

Figure 7:
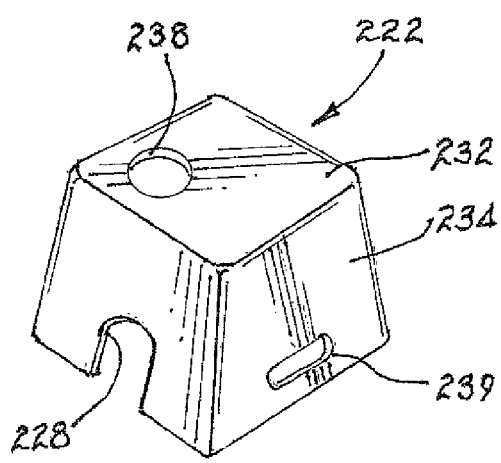
FIG. 7 shows a lowermost unit similar to that shown in FIG. 2C but having a square shape.

Within FIG. 1A, an embodiment of the invention is shown wherein the tops (32, 40, 48) of each of the first, second and third housings (22, 24, 26, respectively) are generally rectangular. It will be understood by those skilled in the art, however, that the pet shelter of the present invention can assume a variety of other shapes, as well. For example, in FIG. 7, first housing 222 includes a top 232 that is generally square in shape. Otherwise, the features of first housing 222 are similar to those already described in FIG. 2C and are labeled by similar reference numerals. It will be understood that second and third housings (not shown) to be stacked upon first housing 222 likewise have generally square-shaped tops.

Figure 8:
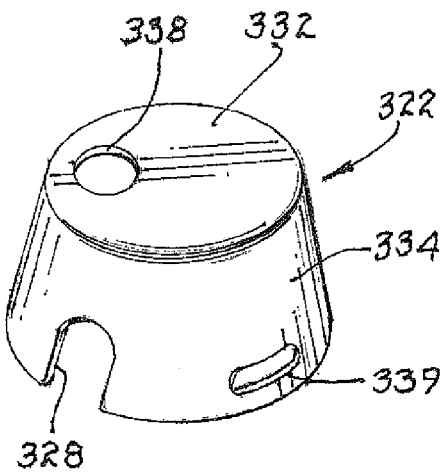
FIG. 8 shows a lowermost unit similar to that shown in FIG. 2C but having a circular shape.

FIG. 8 shows an alternate embodiment wherein first housing 322 includes a top 332 that is generally circular in shape. Otherwise, the features of first housing 322 are similar to those already described in FIG. 2C and are labeled by similar reference numerals. It will be understood that second and third housings (not shown) to be stacked upon first housing 322 likewise have generally circular-shaped tops.

Figure 9:
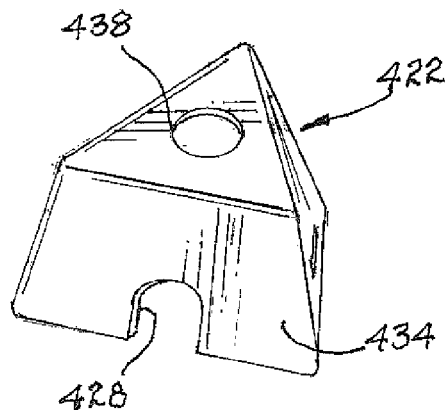
FIG. 9 shows a lowermost unit similar to that shown in FIG. 2C but having a triangular shape.

FIG. 9 shows a further embodiment wherein first housing 422 includes a top 432 that is generally triangular in shape. Otherwise, the features of first housing 422 are similar to those already described in FIG. 2C and are labeled by similar reference numerals. It will be understood that second and third housings (not shown) to be stacked upon first housing 422 likewise have generally triangular-shaped tops.

Figure 10:
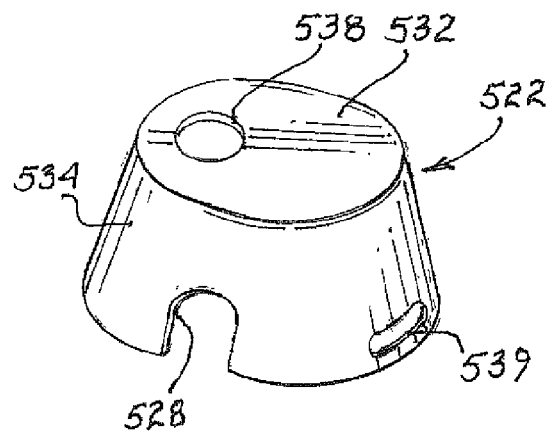
FIG. 10 shows a lowermost unit similar to that shown in FIG. 2C but having an oval/elliptical shape.

FIG. 10 shows yet another embodiment of the present invention wherein first housing 522 includes a top 532 that is generally oval/elliptical in shape. Otherwise, the features of first housing 522 are similar to those already described in FIG. 2C and are labeled by similar reference numerals. It will be understood that second and third housings (not shown) to be stacked upon first housing 522 likewise have generally oval/elliptical-shaped tops.

Figure 11:
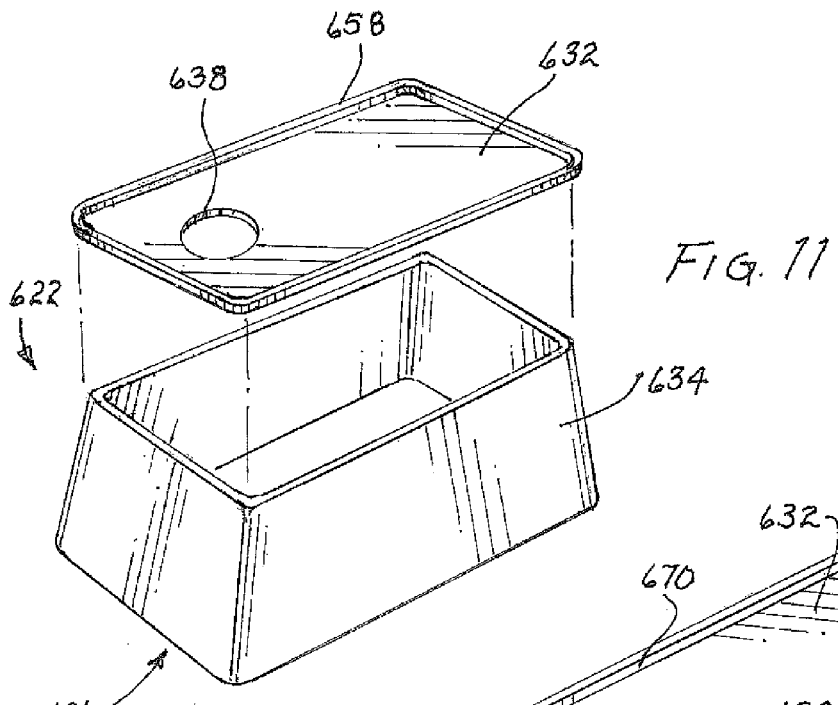
FIG. 11 is a perspective view of an alternate embodiment of the invention wherein the lowermost unit is formed as a two-piece assembly including a generally rectangular sidewall housing and a removable, snap-on top.
Figure 12:
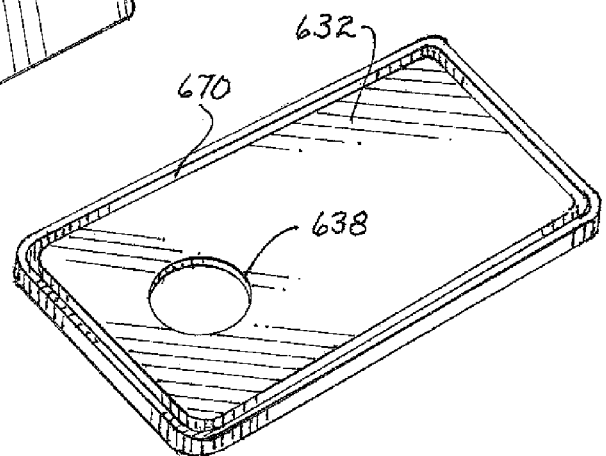
FIG. 12 is a partial perspective view of the underside of the snap-on top shown in FIG. 11.
Figure 13:
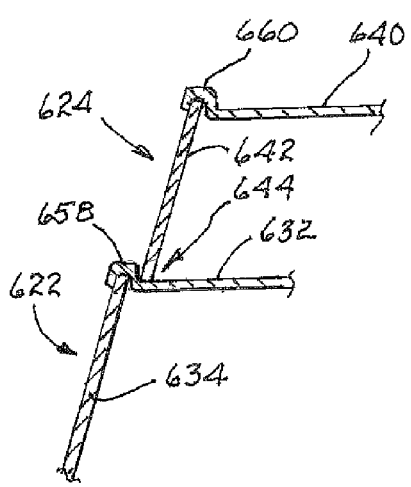
FIG. 13 is a sectional view of a lowermost unit and middle unit stacked in the manner generally shown in FIG. 4 but wherein the top of the lowermost unit is formed by a snap-on lid, and wherein the top of the middle unit is formed by a snap-on lid.

FIGS. 11-13 illustrate a still further embodiment of the present invention wherein each of the stackable housings is formed of separable top and sidewall portions. As shown in FIG. 11, the first, or lowermost, housing 622 includes sidewalls portion 634 and mating top 632. Top 632 is attachable to, and detachable from, the upper end of sidewalls portion 634, much like the plastic lid of a food storage container can be attached to, and detached from a mating base portion. As shown in FIG. 12, wherein top 632 is inverted, the outer periphery of top 632 includes a recessed rim portion 670 for releasably grasping the perimeter of the upper end of sidewall portions 634. Top 632 includes a raised rim 658 on its upper surface, which functions similar to raised lip 58 in the embodiment shown in FIG. 4. Top 632 includes an opening 638 similar to opening 38 of top 40 shown in FIG. 2C.

As shown in FIG. 13, second housing 624 may similarly be formed of a sidewalls portion 642 and a detachable top 640 having a raised lip 660 along its outer perimeter. Second housing 624 may be stacked upon top 632 of first housing 622, whereby raised lip 658 secures open bottom 644 of second housing 624 upon top 632. While not shown in FIG. 13, a third housing constructed in the same manner may be stacked upon top 640 of second housing 624.

Those skilled in the art will now appreciate that a simple and inexpensive pet shelter has been described which provides quiet hiding places for a cat or other pet, while forming a multiple-level structure through which the animal may climb and play. The disclosed pet shelter can be quickly and easily assembled to form a sturdy towered structure merely by stacking one component upon the other, and is disassembled just as easily. Moreover, because the components nest inside each other, the collapsed pet shelter can assume a compact unit that is easy to transport, and which requires relatively little storage space. In addition, the disclosed pet shelter is formed of relatively inexpensive component parts that may be easily manufactured. Further, the above-described pet shelter can be easily customized by a pet owner to provide additional openings merely by punching out and/or cutting out pre-designated relief areas formed in the sidewalls of one or more of its housings.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A stackable, nestable pet shelter comprising in combination:
    a) a first housing being substantially hollow and including:
        i) a first top having a predetermined shape and having an outer perimeter;
        ii) first sidewalls extending downwardly from the outer perimeter of the first top toward an opposing open bottom of the first housing, the first sidewalls tapering outwardly from the first top toward the opposing open bottom of the first housing, and the first sidewalls having a first height;
        iii) an opening in the first sidewalls for allowing an animal to enter and exit the first housing; and
        iv) an opening in the first top for allowing an animal to pass therethrough;
    b) a second housing being substantially hollow and including:
        i) a second top having said predetermined shape and having an outer perimeter, the second top being smaller in size than the first top;
        ii) second sidewalls extending downwardly from the outer perimeter of the second top toward an opposing open bottom of the second housing, the second sidewalls tapering outwardly from the second top toward the opposing open bottom of the second housing, the opposing open bottom of the second housing being commensurate in size and shape with the first top for allowing the open bottom of the second housing to stack upon an upper portion of the first housing, and the second sidewalls having a second height not exceeding the first height; and
        iii) an opening in the second top for allowing an animal to pass therethrough; and
    c) a third housing including:
        i) a third top having said predetermined shape and having an outer perimeter, the third top being smaller in size than the second top;
        ii) third sidewalls extending downwardly from the outer perimeter of the third top toward an opposing open bottom of the third housing, the third sidewalls tapering outwardly from the third top toward the opposing open bottom of the third housing, the opposing open bottom of the third housing being commensurate in size and shape with second top for allowing the open bottom of the third housing to stack upon an upper portion of the second housing, and the third sidewalls having a third height not exceeding the second height; and
        iii) an opening in the third housing, said opening being formed within one of said third sidewalls or said third top;
whereby, when in use, the second housing can be stacked upon the upper portion of the first housing, and the third housing can be stacked upon the upper portion of the second housing, and when not in use, the second housing can be nested within the first housing, and the third housing can be nested within the second housing to form a compact structure for storage or transport.

2. The stackable, nestable pet shelter recited by claim 1 including handhold cutouts formed within the first sidewalls proximate the open bottom of the first housing.

3. The stackable, nestable pet shelter recited by claim 1 wherein:
    a) the first top includes a first raised lip extending along its outer perimeter;
    b) the open bottom of the second housing fits within the first raised lip when the second housing is stacked upon the first top;
    c) the second top includes a second raised lip extending along its outer perimeter; and
    d) the open bottom of the third housing fits within the second raised lip when the third housing is stacked upon the second top.

4. The stackable, nestable pet shelter recited by claim 1 wherein:
    a) the open bottom of the second housing includes a lip that extends over, and engages, the upper portion of the first housing when the second housing is stacked upon the first housing; and
    b) the open bottom of the third housing includes a lip that extends over, and engages, the upper portion of the second housing when the third housing is stacked upon the second housing.

5. The stackable, nestable pet shelter recited by claim 1 wherein at least one of the second sidewalls and third sidewalls includes a reduced thickness relief area that may optionally be removed by a user to form an additional opening in such sidewalls.

6. The stackable, nestable pet shelter recited by claim 1 wherein the opening in the second top is laterally offset from the openings in the first and third tops to prevent an animal from falling directly from the third housing into the first housing.

7. The stackable, nestable pet shelter recited by claim 1 wherein the first, second, and third housings are all formed of plastic material.

8. The stackable, nestable pet shelter recited by claim 1 wherein the first, second and third tops each have a generally rectangular shape.

9. The stackable, nestable pet shelter recited by claim 1 wherein the first, second and third tops each have a generally oval shape.

10. The stackable, nestable pet shelter recited by claim 1 wherein the first, second and third tops each have a generally triangular shape.

11. The stackable, nestable pet shelter recited by claim 1 wherein the first, second and third tops each have a generally square shape.

12. The stackable, nestable pet shelter recited by claim 1 wherein the first, second and third tops each have a generally circular shape.

13. The stackable, nestable pet shelter recited by claim 1 wherein:
   a) the first sidewalls of the first housing have an upper end proximate the first top; and
   b) the first top of the first housing is attachable to, and detachable from, the upper end of the first sidewalls.

14. The stackable, nestable pet shelter recited by claim 13 wherein:
   a) the second sidewalls of the second housing have an upper end proximate the second top; and
   b) the second top of the second housing is attachable to, and detachable from, the upper end of the second sidewalls.

\* \* \* \* \*